United States Patent [19]

Dinsdale et al.

[11] 3,984,746
[45] Oct. 5, 1976

[54] MACHINE TOOLS

[75] Inventors: Jack Dinsdale, Clifton Reynes, near Olney; John Loxham, Bletchley, both of England

[73] Assignee: Cranfield Institute of Technology, Bedfordshire, England

[22] Filed: June 10, 1974

[21] Appl. No.: 478,164

[30] Foreign Application Priority Data
June 11, 1973 United Kingdom............... 27777/73

[52] U.S. Cl................................. 318/571; 51/33 W; 318/568
[51] Int. Cl.²......................................... G05B 19/24
[58] Field of Search.................. 318/568, 571; 90/9, 90/6; 51/33, 165.77, 165 R

[56] References Cited
UNITED STATES PATENTS

| | | | |
|---|---|---|---|
| 3,015,806 | 1/1962 | Wang et al...................... | 318/571 X |
| 3,191,205 | 6/1965 | Gilbert............................ | 318/571 X |
| 3,232,170 | 2/1966 | Findley........................... | 318/571 X |
| 3,267,344 | 8/1966 | McDaniel........................ | 318/571 X |
| 3,273,182 | 9/1966 | McDonald....................... | 318/571 X |
| 3,278,817 | 10/1966 | Johnson et al.................. | 318/571 |
| 3,439,241 | 4/1969 | Martens.......................... | 318/568 |
| 3,445,639 | 5/1969 | Martens.......................... | 318/568 X |
| 3,446,099 | 5/1969 | Lesher et al.................... | 318/571 X |
| 3,469,495 | 9/1969 | Kelly............................... | 318/571 X |
| 3,522,757 | 8/1970 | Loher............................. | 318/571 UX |
| 3,879,898 | 4/1975 | Loxham et al.................. | 51/33 W |

*Primary Examiner*—Robert K. Schaefer
*Assistant Examiner*—John J. Feldhaus
*Attorney, Agent, or Firm*—Haseltine, Lake & Waters

[57] ABSTRACT

A machine for forming gears and the like comprises a workpiece support continuously rotatable about a first axis, a tool support angularly displaceable about a second axis and constructed to support a tool for rotation about a third axis angled to the first axis and an electrical master-slave servo system having a master providing a first electrical signal defining a required angular displacement for the tool support and a second electrical signal for influencing the continuous rotation of the workpiece support in dependence upon the angular displacement defined by the first signal.

11 Claims, 4 Drawing Figures

MACHINE TOOLS

BACKGROUND OF THE INVENTION

This invention relates to machine tools and is particularly concerned with machines for machining or shaping gears, such as spiral and hypoid pinions and crown gears, or slots. In particular, the invention may be applied to machines for rough-cutting and/or finishing such gears or slots with cutting tools and/or grinding wheels.

The invention is particularly applicable to a machine for machining a workpiece to provide a curved-tooth bevel gear. Generally, the invention is concerned with a machine comprising a workpiece support angularly displaceable about a first axis, a tool support angularly displaceable about a second axis and which is constructed to support an annular tool for rotation about a third axis, angled to the first axis, so that a supported tool can not only rotate about its own axis but can also be displaced on an arcuate path about the second axis, and control means for controlling the relative movements about the first axis and at least one of the second and third axes, while the rotation about the third axis is independent of the motions about the first and second axes.

All known spiral bevel gear manufacturing equipment in current use for cutting or grinding slots or spiral gear teeth, e.g. the Gleason machine, incorporate extensive gear trains to effect control between the first and second axes.

U.S. Pat. 3,879,898 relates to a machine of the kind as described above, wherein the control means is in the form of an electrical master-slave servo system for controlling the relative movements.

In one embodiment according to that U.S. Patent Application, the workpiece support is slaved to the tool support and oscillates during machining.

In another embodiment, described as a modification of an existing machine tool, the workpiece support rotates during machining, being slaved to a continuously rotating part of the master so that its rotation is controlled to be dependent upon the rotation of that part, which in that case is a lobed cam forming part of the existing machine. This cam is driven, by an extensive gear train, to rotate between two guides mounted on the tool support. The rotation of the cam thereby oscillates the tool support.

SUMMARY OF THE PRESENT INVENTION

According to the present invention, there is provided a machine, for machining a workpiece, comprising a workpiece support rotatable about a first axis, first drive means for imparting a continuous rotation to the support about the first axis, a tool support angularly oscillatable about a second axis angled at less than 90° to the first axis, second drive means for angularly oscillating the tool support about the second axis, third drive means for imparting a continuous rotation to a tool relative to the tool support about a third axis independently of the motions about the first and second axes, and control means, comprising an electrical master-slave servo system, for controlling the relative movement of the first and second drive means. The servo system comprises: a master which is additional to the first, second and third drive means; first digital, desired value, signalling means coupled to be operated by said master to produce a first digital desired value signal defining angular positions for the workpiece support; first digital, actual value, signalling means with a direct, gearless, coupling to the workpiece support for producing a first pulse train defining the actual angular positions of the workpiece support; second digital, actual value, signalling means with a direct gearless, coupling to the tool support for producing a second pulse train defining the actual angular positions about the second axis of the tool support, fourth digital, desired value, signalling means coupled to one of said master and said first drive means to produce a second digital desired value signal defining desired angular positions for the tool support about the second axis; and digital comparison means for comparing the first signals and for comparing the second signals to produce respective control signals for the first and second drive means.

BRIEF DESCRIPTION OF THE DRAWINGS

For a better understanding of the invention and to show how the same may be carried into effect, reference will now be made, by way of example, to the accompanying drawings, in which.

DESCRIPTION OF PREFERRED EMBODIMENTS

Figure 1:
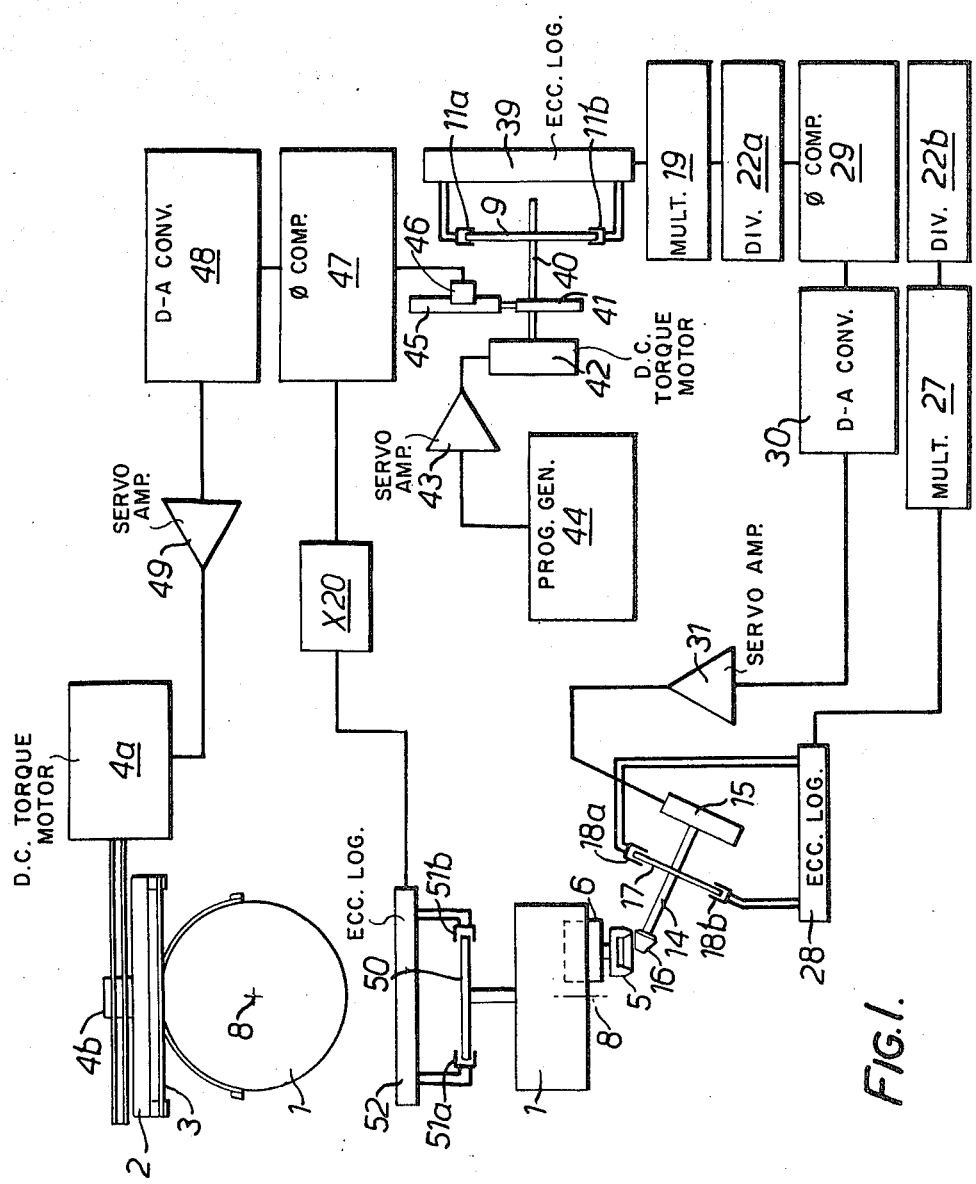
FIG. 1 is a diagram of a gear grinding machine with its control means.

A first embodiment is now described with reference to FIG. 1 which shows a machine tool of the Gleason type in which it is assumed that a gear to be ground has 21 teeth and in which it is ground while the gear is in continuous rotation. In this case, the teeth are ground in the following order

| 1 | 6 | 11 | 16 | 21 |
|---|---|----|----|----|
|   | 5 | 10 | 15 | 20 |
|   | 4 | 9  | 14 | 19 |
|   | 3 | 8  | 13 | 18 |
|   | 2 | 7  | 12 | 17. |

There is a grinding wheel support in the form of a drum 1 which is given a reciprocatory angular movement to a predetermined program. In the case shown in FIG. 1, the reciprocating angular movement is produced by the reciprocating linear motion of a belt carrier 2 coupled to the drum 1 by belts 3. The belt carrier 2 is driven in this example by a d.c. torque motor 4a and a preloaded circulating-ball screw and nut arrangement 4b. A double acting hydraulic cylinder could be used instead. A program controlling the drive provides for the setting of a predetermined acceleration and deceleration separated by a predetermined uniform velocity over a predetermined length, the whole cycle of acceleration, constant velocity and deceleration extending over an angular range set so that the section of the grinding wheel operating on the gear face being ground will travel from no engagement through the engagement angle to no engagement again.

The drum 1 is designed to support releasably an annular grinding wheel 5 driven about its own axis at a predetermined speed by a motor 6 supported by the drum.

Control of the motor 4a is from a program generator 44 driving a d.c. torque motor 42 by way of a servoamplifier 43. The motor 42 drives a shaft 40 on which is mounted an interchangeable cam 41 the shape of which defines the drum oscillation required. The generator 44 in effect constitutes the "master" of a first master-slave servo system, the "slave" being the motor 4a.

The output of the program generator 44 is adjustable and is set to a self-repeating cycle that controls the speed of rotation of shaft 40 so that one complete revolution of the shaft 40 equals one complete oscillation of the drum 1, on which grinding wheel 5 is supported. Shaft 40 will normally rotate at a predetermined and very uniform rate, with a predetermined acceleration during start-up and a predetermined retardation during stopping. It is also provided with an inching facility in which parts of the acceleration and retardation program may overlap.

The interchangeable cam 41 causes a linear scale 45 and reading head 46 to generate pulses to a precise predetermined program defining the required drum oscillation.

The drum 1 carries a radial grating provided by a flat glass member 50 bearing uniformly spaced radial lines in an annular zone of the member 50. In this example there are 200 lines per degree. The member 50 is a circular disc co-operating with two diametrically opposite reading heads 51a and 51b. The member 50 may have provision for eccentric mounting as, and for the purpose, described in U.S. Pat. No. 3,879,898.

The heads 51a and 51b each incorporates a reference section of radial lines and is designed to produce one Moire fringe per radial line. Each head also has four photocells, one pair to provide a reference (sine) signal and the other pair to provide a quadrature (cosine) signal. A pair is provided in each case, 180° out of phase, to compensate for light variations at the photocells.

The reading heads 51a and 51b feed eccentricity logic 52 supplying a signal substantially compensated for any slight eccentricity in the mounting of disc 50, as described in U.S. Pat. No. 3,879,898. The output of the eccentricity logic 52 is multiplied by twenty and is fed, with the output of reading head 46, to a phase comparator 47 the error output of which feeds a digital to analogue converter 48 and a servo amplifier 49 the output of which drives the motor 4a. In this way, the oscillation of the drum is produced by control means not involving a lobed cam coupled by gear trains to a drive motor and not coupled by other, purely mechanical, means to the drum.

Furthermore, as the shaft 40 rotates, pulses are generated by reading heads 11a and 11b associated with 72,000 radial lines on an annular scale of a member 9 mounted on the shaft. These pulses are passed to eccentricity logic 39. The arrangement 9, 11a, 11b and 39 is the same as that of 50, 51a, 51b and 52. The pulses are shaped and multiplied by 20 by device 19, are divided by the number of teeth in the gear to be ground by divider 22a and finally fed, as its first, desired value, input, to a phase comparator 29. The division referred to above is shown as $N_1$, and in the case under consideration $N_1 = 21$.

A shaft 14 supports the gear 16 to be ground and is driven by a d.c. torque motor 15, its rate of angular rotation being controlled through reading heads 18a and 18b and an annular scale with 72,000 uniformly spaced radial lines on a disc 17. Thus, the generator 44 is also the "master" of a second master-slave servo system, in which the slave is the motor 15.

In the case under consideration, the drum used to support the grinding wheel must make one complete oscillation for 5/21 of a revolution of the shaft 14 on which the gear 16 to be ground is supported. The rate of the above clockwise and anti-clockwise oscillation of drum 1 is controlled to a precise and predetermined program to within ± 1.0 arc second.

The pulses generated by the reading heads 18a and 18b, associated with the 72,000 radial lines on the scale mounted on the shaft supporting the gear to be ground, are fed through eccentricity logic 28, multiplied by 20 in shaping and multiplying device 27, divided by the number of teeth skipped on consecutive grinding cycles by divider 22b, and finally fed as the second, actual value, input to the phase comparator 29.

Under the above arrangement, the phase comparator 29, which receives the two trains of pulses from reading heads 18 and 11, is arranged to insure that the pulses from the above two sources shall be in true synchronization to within 0.5 of a pulse during any critical part of the grinding cycle. The above arrangement will cause the shaft supporting the gear 5 to be ground to make 5/21 of a revolution for one revolution of shaft 40, as shown below.

Pulses generated during 5/21 revolution of workpiece supporting shaft $14 = (5/21) \times (72000 \times 20/5) = 68571.42857$ Pulses generated during one revolution of shaft $40 = (72000 \times 20/21) = 68571.42857$ A means of designing the cam 41 will now be considered.

Consider a Gleason machine set up for the grinding of a particular gear of (say) 21 teeth in which the results are of the highest attainable standard of quality for form of tooth to suit a mean operating condition. Let a strip of reflecting optical scale grating be fixed to drum 1, and a reading head be arranged to generate pulses at a rate proportional to the oscillation of the drum. A similar grating and head (or more likely a self-contained digitizer) are fitted to the work spindle shaft 14. During an actual grinding operation, pulses from drum 1 and shaft 14 are suitably processed such that the relationship between the two motions is established. An Elliott 903 computer could be arranged to read in the two pulse trains and produce a record on punched paper tape, and also in graphical form.

The frequency of this pattern should then be adjusted to represent the best clockwise and anti-clockwise oscillation of drum 1 against the basis that 1 complete revolution of drum 1 equals 72,000 pulses. This complex pattern of pulses would then be the ideal pattern that would be generated by a reading head operating on a 72,000 line radial scale fitted to the oscillating drum 1 that supports the grinding wheel while the shaft 14 that supports the gear to be ground makes 5/21 of a revolution.

The cam 41, the glass scale 45, and the reading head 46 are made so that one revolution of the shaft 40 produces pulses that correspond precisely with the pulses obtained from the preliminary investigation just described above.

The drum 1 is then driven under the control of the phase comparator 48, by synchronizing the pulses generated by head 46 with the pulses generated by the reading heads 51a and 51b.

In the above arrangement a cam is produced for each size of gear to be ground in the same way that different ratios in the time occupied by the skip and the grinding sections of a complete operating cycle creates a demand for different forms of lobed cams to be fitted to the crankwheel of the standard Gleason machine. Circumstances may also occur where two gears of the same basic dimensions require different bedding patterns, i.e. tip and/or root relief, because of the different amounts and type of distortion that are expected to occur under load in use of the final gears. In the system now proposed a small number of standard cams may be used and suitable small modifications to their output made by electronic means. The mechanical and electronic adjustments of U.S. Pat. No. 3,879,898 would provide this facility.

Figure 2:
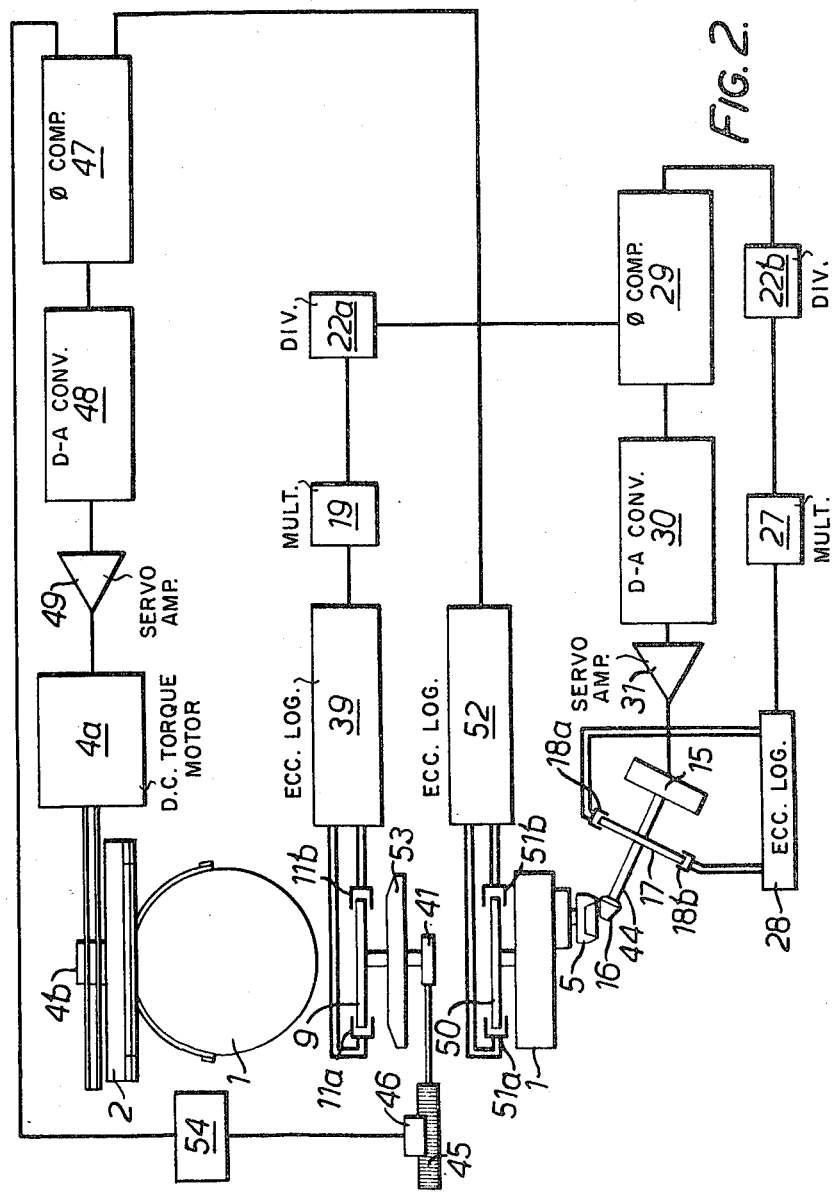
FIGS. 2 to 4 illustrate three modifications of FIG. 1.

A second embodiment is shown in FIG. 2 in which the parts shared with the first embodiment are given the same references. In this case, the crankplate 53 of a Gleason machine is driven in the conventional manner, i.e. from a main drive motor via feed change gears, this main drive motor constituting the "master" of two servo-systems. The glass disc 9 is mounted on the crankplate. Reading heads 11a and 11b are spaced 180° apart and are connected via the logic 39 to the electronic shaping and multiplying device 19 which multiplies the pulses produced per radial line by 20. This gives 72,000 × 20 pulses per revolution of the crankplate, equal to one pulse for an angular rotation of 0.9 arc second. Divider 22a divides the pulses by a factor N equal to the number of teeth to be skipped during the return roll of the grinding wheel 5.

Work spindle 14 also carries the radial scale 17, with pulses from its reading heads 18a and 18b connected to pulse multiplication and division device 27 as before. In this case, the pulses are divided by a factor Ni equal to the number of teeth on the gear to be ground. The two trains of pulses are compared in the phase comparator 29 which produces an output proportional to the phase difference between them. This signal is then used to drive the work spindle torque motors 15 via digital-to-analogue converter 30 and drive amplifier 31. The factors N and Ni control the index ratio, where (Work spindle speed/Crankplate speed) = (N/Ni)

This part of the control system insures that the work spindle and crankplate are synchronized to a very high accuracy. The position of the reciprocating drum 1 has also to be synchronised to the motion of the crankplate and, in a conventional Gleason machine, this is achieved by the generating cam. The removal of this cam makes it necessary to drive the reciprocating drum by some other means. For this purpose, the cam 41 is fitted to the crankplate shaft, the cam being shaped to a predetermined pattern. A cam follower is arranged to actuate linear grating 45, 46 to produce a train of pulses proportional to the displacement of the cam. These pulses form the input demand to the digital positioning control system already described with reference to FIG. 1. Thus, again, drum 1 is reciprocated by means of a belt and linear actuator, which could be a double acting hydraulic cylinder (as described in the U.S. Pat. No. 3,879,898) or a ball screw and motor arrangement. In either case, position feedback is provided by means of the grating associated with the angular movement of drum 1, and the control system provides an error signal to drive an electrohydraulic valve in the case of the hydraulic cylinder arrangement, or the motor 4a if the ball screw solution is preferred.

The cam 41 may be replaced with other cams with modified profiles in a similar fashion to the conventional Gleason machine. However, in cases in which cams would produce only a change in amplitude of the reciprocation of the drum 1 and not a change in 'shape' of this motion, it is possible to use only one cam and control the amplitude of reciprocation electronically. This could be achieved by dividing the pulses from the linear grating system connected to the cam follower by divider 54.

Figure 3:
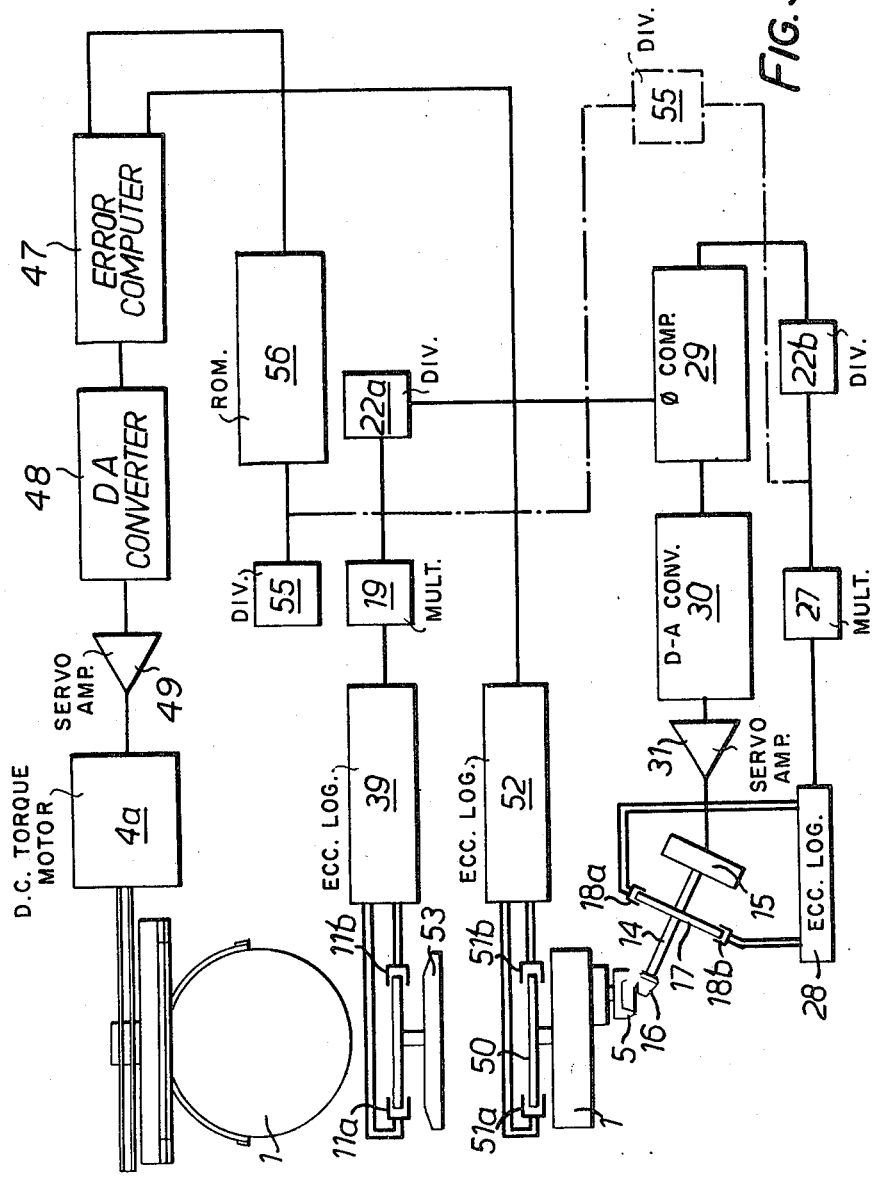

A further modification is shown in FIG. 3. The crankplate 53 is driven from the main drive motor and the work shaft 14 is synchronized in the same manner as in FIG. 2. Pulses from the reading heads 11a and 11b are divided in divider 55 by a factor $N_x$, and the resulting pulses used to address an electronic Read Only Memory (ROM) 56. These devices have the ability to 'read out' a series of fixed digital words when 'addressed'. These words form the input demand to a digital positioning control system, as already described. Although the ROM can only read out a fixed series of digital words, the words can be inserted into it at the program stage, which is a 'once and for all' process. Therefore, if a new series of words is required to be read out, the ROM will be replaced by one which has the new words programmed into it. This technique is used to make the reciprocating drum 1 follow several alternative prescribed patterns. The factor $N_x$ introduced prior to the ROM address will be of such value that the position of the drum 1 can be resolved to a sufficiently high accuracy, at the same time keeping the number and size of the ROMs to a minimum.

Alternatively the constant frequency train of pulses to address the ROM could be derived from the workspindle grating (suitably multiplied/divided to allow for the index ratio) instead of from the crankplate. In this arrangement, the work spindle would therefore become a subsidiary or intermediate master to which motor 4a is slaved. This modification is shown by dotted lines in FIG. 3.

Figure 4:
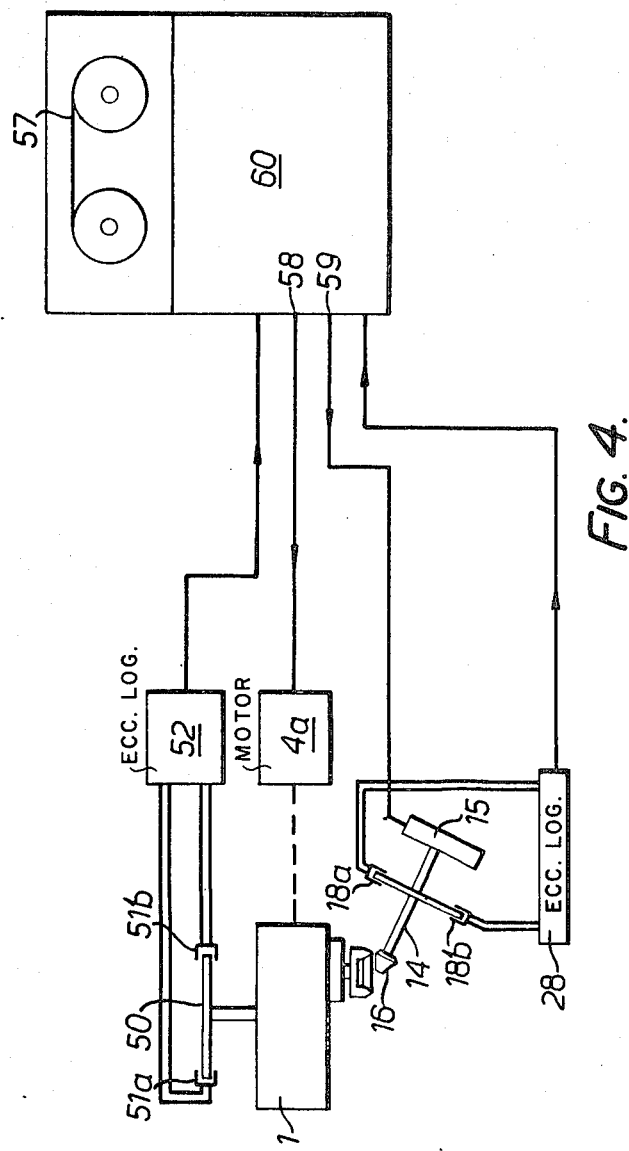

An alternative means of control would be to cause the shaft 14 to rotate and drum 1 to oscillate in a fixed relationship determined by a program pre-recorded on magnetic tape. In this case the tape is the "master". A master clock pulse train would be recorded on the tape and would be used to synchronize the shaft 14 in the phase-locked loop principle, these pulses replacing the pulses generated by the crankplate grinding and reading heads. At each clock pulse or every Nth pulse, where N is of suitable value to insure adequate updating, a digital word is recorded on the tape which represents the correct angular position of drum 1 relative to the position of shaft 14. This digital word is used as a position demand into an error computer, thus replacing the ROM position feedback derived from the drum grating and reading heads. The scheme as outlined above requires a new magnetic tape to be prepared for each new gear to be ground, but has the advantage that detail changes could be made to spare copies of the tape, to facilitate gear development. A numerical control computer as used for a milling machine may implement this system, as illustrated in FIG. 4. The computer might be, for example, the Cincinnati numerical machine tool control computer operable in three dimensions, only two of these being utilized in the present scheme. The computer 60 accepts tape 57 and supplies control signals on two (58 and 59) of its three control outputs.

It will be seen that all embodiments utilize a continuously rotating workpiece, thereby reducing problems of backlash that may occur in oscillating workpieces, particularly those with large inertia. Also purely mechanical means of converting cam shape to drum oscillation is avoided.

We claim:

1. A machine, for machining a workpiece, comprising a workpiece support rotatable about a first axis, first controllable drive means for imparting a continuous rotation to the support about the first axis, a tool support angularly oscillatable about a second axis angled at less than 90° to the first axis, second controllable drive means for angularly oscillating the tool support about the second axis, third drive means for imparting a continuous rotation to a tool relative to the tool support about a third axis independently of the motions about the first and second axes, and control means, comprising an electrical master-slave servo system, for controlling the relative movement of the first and second drive means, the servo system comprising: a master which is additional to the first, second and third drive means; first digital, desired value, signalling means coupled to be operated by said master to produce a first digital desired value signal defining desired angular positions for the workpiece support; first digital, actual value, signalling means with a direct, gearless, coupling to the workpiece support for producing a first pulse train defining the actual angular positions of the workpiece support; second digital, actual value, signalling means with a direct, gearless coupling to the tool support for producing a second digital actual value pulse train defining the actual angular positions about the second axis of the tool support; second digital, desired value, signalling means coupled to said master to produce a second digital desired value signal defining desired angular positions for the total support about the second axis; and digital comparison means for comparing the first signals and for comparing the second signals to produce respective control signals for the first and second drive means.

2. A machine according to claim 1, wherein the master is a motor to which the first, desired value, signalling means are coupled.

3. A machine according to claim 2, wherein the second, desired value, signalling means are coupled to the motor and incorporate changeable means defining the relationship between the motor displacements and the second desired value signal to determine workpiece tooth profile.

4. A machine according to claim 2 wherein the first digital, desired value, signalling means is operable to emit a pulse train representing the desired angular positions for the workpiece support, and the comparison means comprises a digital pulse train phase comparator for comparing the two pulse trains from the two first signalling means.

5. A machine according to claim 4 wherein the fourth, desired value, signalling means comprises a cam with a direct, gearless, coupling to the motor, a cam follower, and a pulse train producing means coupled to the cam by the follower for producing said second digital, desired value, electrical signal as a pulse train, and wherein the comparison means comprises a second digital pulse train phase comparator for comparing the two pulse trains from the two second signalling means.

6. A machine according to claim 4, wherein the fourth, desired value, signalling means comprises a digital position detector for detecting the position of the motor and a memory addressable by the position detector to emit the second digital, desired value, electrical signal to define desired angular positions for said slave.

7. A machine according to claim 4, wherein the fourth, desired value, signalling means comprises a memory and wherein the first, actual value, signalling means coupled to the workpiece support provides addressing signals for the memory so that said tool support is slaved to the master by way of the first drive means.

8. A machine according to claim 4, wherein at least one of the signals supplied to the comparison means is supplied via an adjustable digital value modifying means for adjusting the value represented by the associated signal.

9. A machine according to claim 1 wherein the master, the desired value signalling means and the comparison means are constituted by a digital computer including means for receiving a storage medium from which said desired value signals can be obtained by the computer.

10. A machine according to claim 1, wherein the desired value signals are pulse trains, and wherein the comparison means comprises two digital pulse train phase comparators for comparing respective pairs of the pulse trains.

11. A machine according to claim 10, wherein at least one of the signalling means is coupled to the comparison means by adjustable pulse train modifying means for adjusting the value represented by the associated pulse train, whereby said continuous rotation of the workpiece support is slaved to the master such that the continuous rotation is in presettable relationship with the oscillation imparted to the tool support by the master.

* * * * *